March 18, 1924.  
E. SIEGEL  
MOTOR VEHICLE LOCK  
Filed May 10, 1922  
1,487,403
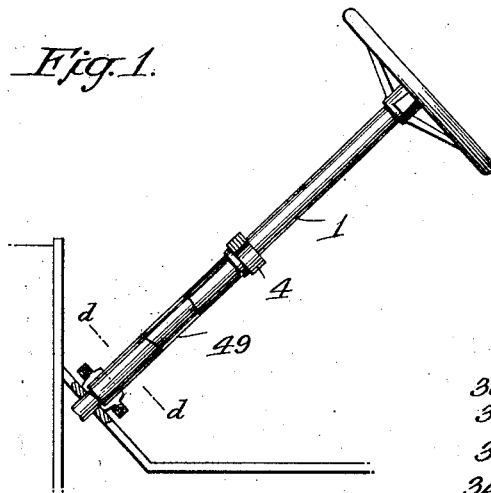
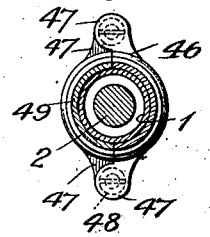
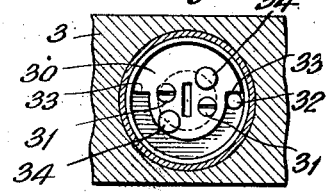
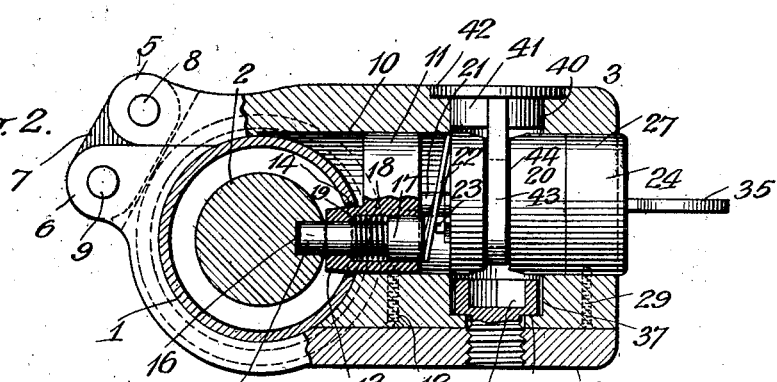
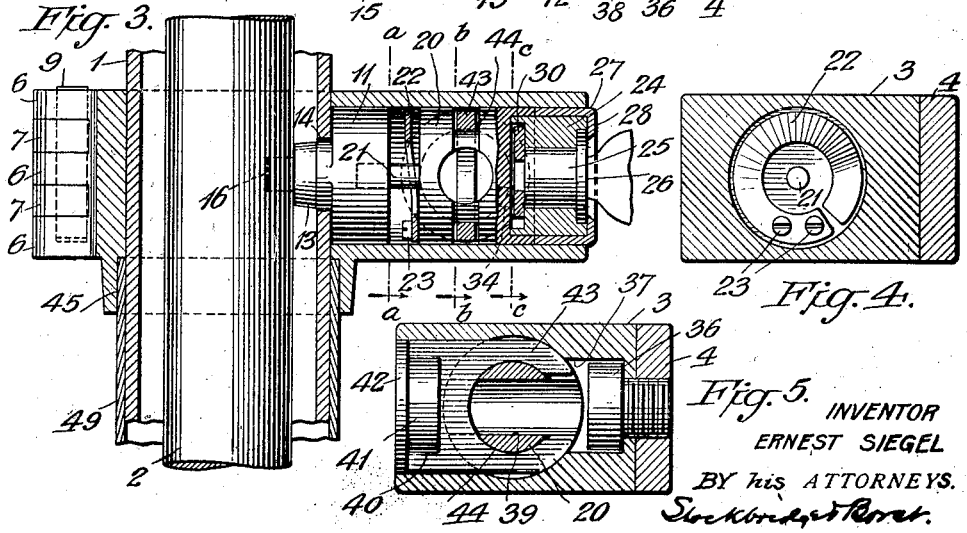
INVENTOR  
ERNEST SIEGEL  
BY his ATTORNEYS.

Patented Mar. 18, 1924.

1,487,403

UNITED STATES PATENT OFFICE.

ERNEST SIEGEL, OF NEW YORK, N. Y., ASSIGNOR TO AUTO KONTROL LOCK CORPORATION, A CORPORATION OF NEW YORK.

MOTOR-VEHICLE LOCK.

Application filed May 10, 1922. Serial No. 559,713.

*To all whom it may concern:*

Be it known that I, ERNEST SIEGEL, a citizen of the United States, residing at New York, in the county of New York and State of New York, have invented certain new and useful Improvements in Motor - Vehicle Locks, of which the following is a full, clear, and exact description.

This invention relates to locking devices for motor vehicles for the purpose of preventing their theft or unauthorized use. More particularly, it relates to a locking device which may be mounted upon the steering column housing and which is adapted to control the operation of the steering rod therein. Various devices have been proposed for locking the steering mechanisms of vehicles against operation, but they have been largely unsatisfactory for various reasons, among which it may be mentioned that they have been susceptible of tampering or injury by an unauthorized person within a short interval of time in such a manner as to enable operation or towing away of the vehicle. It has also been possible with a pipe wrench to quickly cut or sever the housing of the steering column so as to permit the rotation of the upper part thereof with the steering rod, and thereby the locking device upon the upper end of the housing was rendered ineffective. Another objection has been that considerable changes in the usual construction of the steering wheel or post have been necessary in order to apply many of the locking devices thereto, which greatly increased the cost of equipping the vehicle with the lock. Another objection has been that the attaching means and the means for holding the parts together have been exposed sufficiently to permit of tampering or removal of the lock in order to render it ineffective.

An object of the invention is to provide an improved locking device for motor vehicles which may be set to prevent relative movement between two parts thereof; which, when in a locked condition, will effectively conceal and protect the locking means and the operating parts against tampering, injury or removal with ordinarily available tools; which prevents disablement of the lock, or the rendering of the same ineffective by the cutting of the steering column casing or housing between the lock and the dash of the vehicle; which is capable of withstanding severe shocks or blows or cutting tools without disablement or removal; which can be readily and easily attached to the common makes of motor vehicles within a short interval of time and without material changes in their construction; and which is exceedingly simple, reliable, durable, compact and inexpensive. Other objects and advantages will be apparent from the following description and the novel features of the invention will be particularly pointed out in claims. The nature of the invention will appear from the following description of the preferred embodiment of the invention taken in connection with the accompanying drawings, in which—

Fig. 1 is an elevation of a portion of a vehicle and the steering column with my improved lock applied thereto;

Fig. 2 is a transverse section through the same and the locking device;

Fig. 3 is a sectional elevation through the same;

Fig. 4 is a section of the same taken substantially along the line *a—a* of Fig. 3;

Fig. 5 is a section of the same taken substantially along the line *b—b* of Fig. 3;

Fig. 6 is a section of the same taken substantially along the line *c—c* of Fig. 3; and Fig. 7 is a section through the steering column and the column protecting sleeve taken substantially along the line *d—d* of Fig. 1.

In the illustrated embodiment, the locking device is applied to the housing 1 of the steering column in which a steering rod 2 passes longitudinally. A pair of arms 3 and 4 are provided with ears 5 and 6, respectively, which are connected by a plurality of links 7. The links are pivotally secured between the ears by pins 8 and 9 which pass through the ears and links to form a slightly adjustable hinge or articulated connection between the arms 3 and 4, the arms and links together forming a clamp. The abutting faces of the arms, adjacent the articulately connected ends, are concave to closely conform to and embrace the periphery of the housing of the steering column.

One of the arms of the clamp, such as arm 3, is provided with a recess 10 which extends from the side end face thereof into the concave housing embracing surface thereof, and at the inner end of this recess a bearing block 11 is fitted. This block is held against displacement in the recess in a suitable manner, such as by a screw 12 which passes through the arm 3 and into the block from the face of the arm 3 abutting the arm 4, so that the head of the screw will be concealed by the arm 4. The block 11 is provided with an eccentric boss 13 which extends radially through an aperture 14 in the housing 1 so as to prevent rotation and axial movement of the clamping device upon the housing. A locking member in the form of a bolt 15 is reciprocatingly mounted in the boss portion 13 of the block and is adapted to enter a radially disposed recess 16 in the periphery of the steering rod 2 when the rod is rotated to bring the recess into alignment with the locking bolt 15. The locking bolt is provided with an enlarged head 17 at its inner end, and a helical spring 18 surrounds the locking bolt and reacts at one end upon the head 17 of the bolt and at the other end against a shoulder 19 in the aperture in the block through which the bolt slides. The spring yieldingly stresses the bolt in a direction away from the steering rod 2 so as to retract the inner end of the bolt from the recess 16 and release the steering rod for rotation.

A barrel or interponent 20 is rotatably disposed in said recess 10 and an axially extending pin 21 upon the inner end thereof has a rotatable bearing in the abutting face of the block 11. A cam 22, formed of a resilient strip of metal, is secured at one end in a suitable manner, such as by screws 23, to the end face of the barrel which faces the block 11, and extends helically with respect to the axis of the barrel, the other end of the cam being free. When the barrel or interponent 20 is rotated in one direction the helical cam will engage the enlarged end 17 of the locking bolt and yieldingly press the latter in a direction toward the steering rod 2 so that when the recess 16 of the steering rod is brought into alignment with the locking bolt, the latter will be snapped into locking engagement therewith, it being understood, of course, that the resilient force of the cam 22 is considerably greater than the resistance offered by the spring 18. When the barrel is rotated in the opposite direction the helical cam will move away from the enlarged end of the locking bolt so as to release the same, whereupon the spring 18 will shift the locking bolt outwardly out of locking engagement with the recess 16 of the steering rod.

A locking device 24 is disposed in the outer open end of the recess 10 so as to close the same, and has a slight telescopic engagement with a recess in the outer end face of the barrel 20. The locking device may conveniently comprise a cylinder or pin and tumbler lock of any well known construction, and the rotating key controlled barrel 25 thereof is provided upon its outer face with a tempered or case-hardened plate 26 having a slot therein through which the key may be inserted into the barrel. A bushing sleeve 27 surrounds the locking device 24 and is provided with an inturned flange 28 which overlies the end of the locking device and the hardened plate 26 so as to prevent displacement of the plate 26 from the face of the barrel. The end of the barrel 25 is provided with a pair of pins, not shown, which enter recesses or apertures (not shown) in the plate 26 so as to cause the plate 26 to rotate with the barrel and hold the key slot of the plate in alignment with that of the barrel. The sleeve or bushing 27 is of hardened steel or similar material. A screw 29 passes through the arm 3, from the face thereof abutting the arm 4, and engages the bushing 27 and the locking device 24 to prevent rotation or axial displacement of the same within the recess.

The inner end of the barrel 25 of the locking device is provided with a cam 30 which is secured thereon in a suitable manner, such as by screws 31, the rotation of the cam 30 and barrel 25 being limited to one-half a revolution by a pin 32 projecting from the end face of the housing of the locking device 24, and engaged by substantially diametrically disposed shoulders 33 of the cam 30. The cam 30 is provided with pins 34 projecting from the end face thereof which enter correspondingly spaced recesses in the abutting end face of the barrel or interponent 20 so that when the barrel 25 of the locking device is rotated, the barrel or interponent 20 will be given a corresponding rotation in the recess 10. The barrel of the locking device is rotated by a key 35.

A screw 36 passes through the arm 3 from the recess 10 and has threaded engagement with the arm 4 of the clamp to clamp the two arms together and tightly against the housing of the steering column. The head of the screw 36 is countersunk in a recess 37 opening from the recess 10 so as to clear the barrel or interponent 20. The screw is provided in its head with a non-circular socket 38 in which a wrench having a corresponding periphery may be inserted for rotating the screw to tighten or loosen the same. The barrel 20 is provided with a diametrically extending aperture 39 which, by the rotation of the barrel, may be brought into alignment with the recess 37 and through which the wrench may be inserted into the socket or recess 38 of the screw.

The arm 3 is provided with a recess 40 in alignment with the recess 37, but arranged crosswise of the recess 10, so that the wrench may be inserted through recess 40 and through the aperture 39 of the barrel or interponent 20 when it is desired to rotate the screw 38. The aperture 40 is normally closed by cap or closure 41 having a flanged head 42 which is countersunk into the outer face of the arm 3. The closure is provided with inwardly extending arms 43 which are adapted to embrace the barrel or interponent 25 in a reduced annular groove 44, the free ends of the arms 43 being hooked toward one another so as to normally interlock with the periphery of the barrel and prevent removal of the closure. When the barrel or interponent 20 is rotated into a position in which the aperture 39 extends at right angles to the axis of the aperture 40 the portion cut away by the aperture 39 will provide clearance for the passage of the hooked ends of the arms 43, and permit of the removal of the closure. This position of the barrel 20, which permits removal of the closure, is halfway between the limits of rotation of the barrel, so that when the barrel is in either its locked or unlocked position the closure will be interlocked therewith.

The lower end face of the clamp device formed by the arms 3 and 4, is provided with an annular recess 45 immediately surrounding the housing 1. A binder sleeve 46 is slidably mounted upon the lower end of the housing 1 and is longitudinally split into two sections to permit of its application to the housing. Each section is provided at each side with an ear 47, which when the sections are assembled, overlie with one another at each side, and screws 48 pass from one of each pair of ears into threaded engagement with the other so as to lock the sections together, the heads of the screws being accessible from the under face of the binder sleeve when the sleeve is disposed on the housing. The binder sleeve is provided in the upper end face with an annular recess in which the end of a longitudinally extending split protecting sleeve 49 is disposed, the opposite end of the split sleeve 49 entering the recess 45 of the cam. The protecting sleeve 49 and the binder sleeve 46 are preferably made of very hard material, such as tempered or case hardened steel, so that injury or destruction by hack saws, pipe cutting tools, or hammer blows, will be extremely difficult, if not impossible. The binder sleeve and the clamp prevent separation of the sections of the sleeve 49, the clamp prevents upward movement of the split sleeve, and the split sleeve by its engagement in the recess of the binder sleeve prevents movement of the binder sleeve upwardly along the steering column housing away from the dash board.

In the application of the locking device to a vehicle, the housing 1 is drilled to provide the aperture 14 at the point where the clamp is to be applied and the steering rod 2 is drilled to provide a recess 16 in alignment with the aperture 14 when the steering rod is in the position in which it is desired that it be locked. The closure 41 is removed from the recess 40 and the barrel or interponent 20 is rotated through the pins 34 and the locking barrel 25 of the locking device to bring the aperture 39 into alignment with the recess 37. A wrench may then be inserted through the open aperture 40, through the recess 10 and into the recess 38 of the screw 36. The arms 3 and 4 are applied around the housing and brought together and the screw 36 threaded into the arm 4 by a rotation of the wrench, the tightening of the screw serving to clamp the arms 3 and 4 tightly together and firmly to the housing 1. During the application of the arms 3 and 4 to the housing 1, the boss 13 enters the aperture 14 of the housing. The barrel 20 may then be rotated midway between its extreme positions so as to bring the aperture 39 crosswise of the arms 43. The closure 41 may then be applied to the arm 3 to close the recess 40, at which time the arms 43 will pass through the clearance spaces provided at the ends of the aperture 39, after which the rotation of the barrel to either limit of its movement will interlock the closure with the barrel.

At one limit of the movement of the barrel 20, the low point of the helical cam 22 will be engaged by the enlarged end 17 of the locking bolt 15. In this position the other end of the locking bolt will be out of the recess 16 of the steering rod 2, and the steering rod 2 may be rotated as desired in the operation of steering the vehicle. If now the barrel 20 is rotated through 180° by the operation of the key 35 the helical cam will move along the head of the locking bolt and as the higher points of the cam engage the head 17 of the locking bolt, the latter will be yieldingly stressed to the left (Fig. 2) and towards the steering rod 2. When the steering rod is rotated to bring the recess 16 into alignment with the locking bolt, the resilient cam 22 will snap the locking bolt into the recess to prevent further rotation of the steering rod. The steering mechanism of the vehicle is then locked against operation and it will be impossible for a thief or unauthorized person to steer the vehicle, which effectively prevents its removal for any considerable distance from the locality in which it has been left in locked condition. When it is desired to release the steering mechanism for operation, the key 35 is inserted into the locking device and rotated through 180°, which operation imparts a corresponding rotation to the barrel 20 and shifts the cam 22 in a reverse direction so as to release the locking bolt, whereupon the spring 18 retracts the locking bolt out of the recess 16 and releases the steering rod for operation.

When it is desired to use the split protecting sleeve 49 and the binder sleeve 46 for protecting the housing, the binder sleeve is first placed upon the lower part of the housing with the heads of the screws facing the dash. The sections of the split sleeve 49 are then assembled around the housing 1 with the lower ends entering the recess in the upper face of the binder sleeve. The locking device is then applied to the steering column with the upper end of the sections of the split sleeve 49 entering the recess 45 in the under end face of the clamp device. The completion of the application of the clamp device to the steering column serves to prevent removal of the split sleeve 49 or the binder sleeve 46 and it will be impossible for anyone to sever or cut the housing 1 below the locking device so as to render the locking device ineffective.

The pins 8 and 9 are driven under considerable pressure through the ears and links 7 from the upper face, and do not entirely pass through the lowermost ear of each arm, the lower end of the ear being closed so as to prevent anyone from driving the pins outwardly again. It will, therefore, be extremely difficult, if not impossible, to remove the pins 8 and 9 so as to release the clamp. The screws 12 and 29 which hold the block 11 and the locking device 24 within the clamping device, are accessible only when the arms are separated, and the arms can only be separated when the locking device has been shifted to unlocked position or to an intermediate position away from locked position so as to permit the removal of the closure 41. All of the exposed parts of the device are made of hardened material such as tempered or case hardened steel so that the lock cannot be disabled by blows, sawing or cutting.

It will be obvious that various changes in the details and arrangements of parts herein described and illustrated for the purpose of explaining the nature of the invention, may be made by those skilled in the art within the principle and scope of the invention.

I claim:

1. A lock for motor vehicles having a steering column housing and a steering rod in said housing, comprising a clamp adapted to embrace and be clamped to said housing, a locking member carried by the clamp and movable through an aperture in the portion of the housing embraced by the clamp into and out of locking engagement with the steering rod, a locking device carried within the clamp and operable from the exterior thereof, a helical cam of resilient material, an interponent rotated by said locking device and mounting said cam in a position to engage and yieldingly stress the locking member in one direction, and a spring device for shifting the locking member in the opposite direction when released by said cam.

2. A lock for motor vehicles having a steering column housing and a steering rod in said housing comprising a clamp adapted to embrace and be clamped to said housing, a locking member carried by the clamp and movable through an aperture in the portion of the housing embraced by the clamp into and out of locking engagement with the steering rod, an interponent movably carried in said clamp, a resilient cam carried by the interponent and operable thereby to stress the locking member yieldingly in one direction, a spring for shifting the locking member in the opposite direction when the member is released by the cam, and a locking device within the clamp, operable from the exterior thereof, and connected to said interponent for operating the same to shift the cam and thereby vary the position of the locking member.

3. A lock for motor vehicles having a steering column housing and a steering rod in said housing, comprising a clamp adapted to embrace and be clamped to said housing, a locking member carried by the clamp and movable through an aperture in the portion of the housing embraced by the clamp into and out of locking engagement with the steering rod, a resilient cam for stressing the locking member in one direction, means including a locking device for operating the cam to change its effect upon the member, and resilient means for shifting the member in a direction opposite to that produced by the cam when the member is released by the cam.

4. A lock for motor vehicles having a steering column housing projecting from a dash, and a steering rod in said housing, comprising a clamp adapted to embrace and be clamped to said housing and having a recess in its lower end face surrounding the housing, a binder sleeve adapted to be placed upon the housing and against the dash, a longitudinally split sleeve of exceedingly hard metal embracing the housing with its lower end embraced within the binder sleeve and its upper end in said recess, and means within the clamp, operable to prevent rotation of the steering rod in said housing.

5. A lock for motor vehicles having a steering column housing projecting from a dash and a steering rod in said housing comprising a clamp adapted to embrace and be clamped to said housing and having a recess in its lower end face surrounding the housing, a split binder sleeve having its sections attached together by screws accessible from one end face disposed upon said housing with the said end face abutting the dash, a longitudinally split sleeve of exceedingly hard metal embracing the housing with its lower end embraced within the binder sleeve and its upper end in said recess, and means within the clamp operable to prevent rotation of the steering rod in said housing.

6. In a lock for motor vehicles having a steering column housing and a steering rod in said housing, a clamp embracing said housing and comprising two arms, a link hinged to adjacent ends of the arms to permit of separation or approach of the arms, relatively to one another, said arms having in their abutting faces cooperating concavities which closely fit the periphery of the housing, means carried by one of the arms operable to lock the steering rod against rotation in the housing, and means for clamping together the free ends of the arms.

7. In a lock for motor vehicles having a steering column housing and a steering rod in said housing, a clamp embracing said housing and comprising two arms articulately connected, one of the arms having therein a recess extending from its end face to the housing engaging surface, a block at the inner end of said recess, a locking member carried by said block for movement through the housing into locking engagement with the steering rod, a screw accessible for operation through the recess for clamping the arms together and to the housing, an interponent rotatable in said recess and carrying a cam for operating said member, a locking device disposed in and closing the outer end of the recess, said locking device controlling the operation of the interponent, said arm with the recess having a second recess at right angles thereto and substantially aligned with the screw through which access may be had to the screw to tighten or loosen the same, said interponent having an aperture through which access may be had from the second recess to the screw when the interponent is in one rotative position, screws passing through the arm into the block and locking device from the face of the arm abutting the other arm to prevent displacement or removal of the block or locking device, and a closure for the second recess interlocking with the interponent to prevent removal of the closure when the cam is in its member operating position.

In witness whereof, I hereunto subscribe my signature.

ERNEST SIEGEL.